April 19, 1966     W. E. ESPLIN     3,246,417
FISHING DEVICE
Filed Feb. 7, 1964
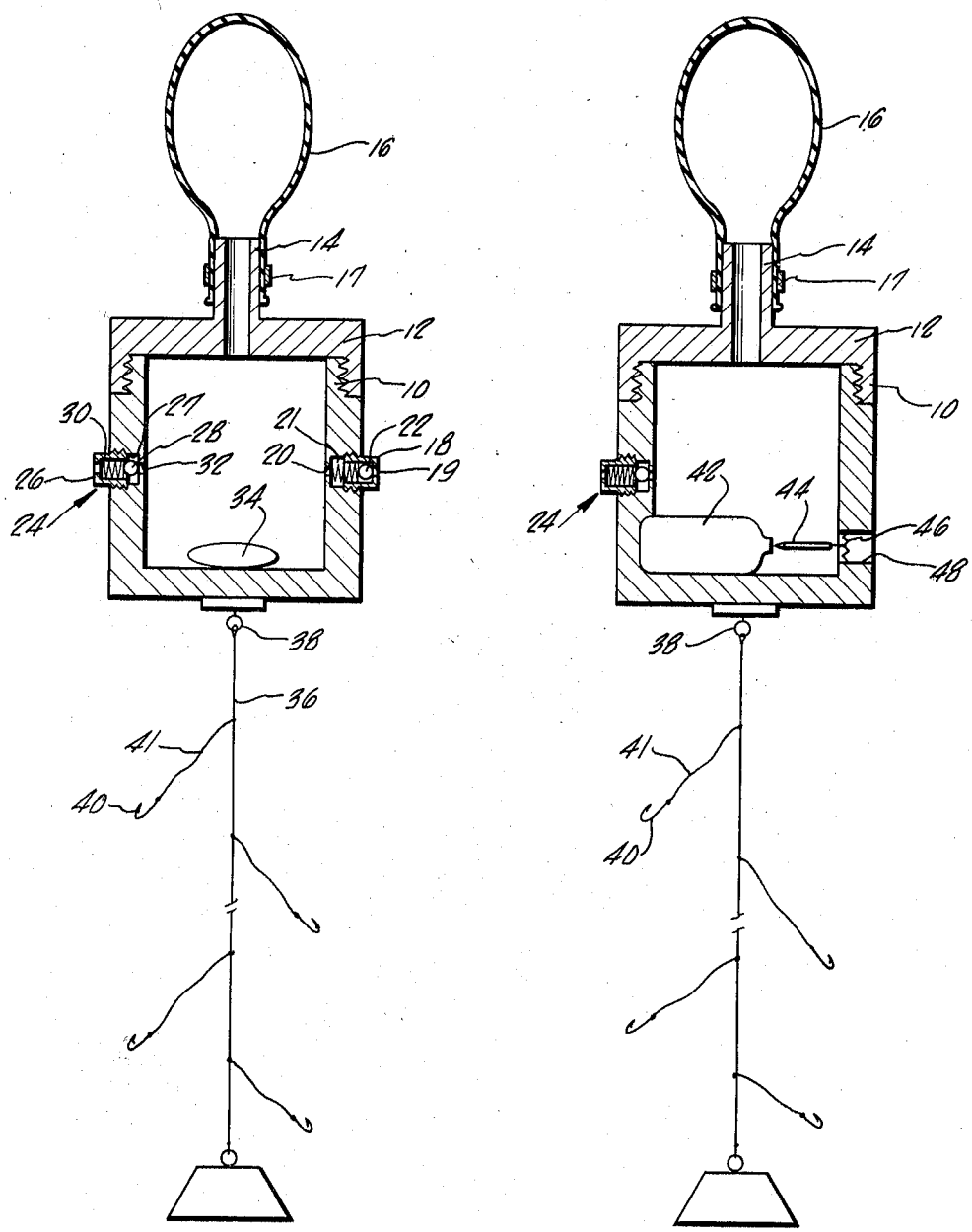
INVENTOR.
WILLIAM E. ESPLIN
BY
Christie, Parker & Hale
ATTORNEYS.

United States Patent Office 3,246,417
Patented Apr. 19, 1966

3,246,417
FISHING DEVICE
William E. Esplin, 15445 Labrador St.,
Sepulveda, Calif.
Filed Feb. 7, 1964, Ser. No. 343,364
4 Claims. (Cl. 43—43.14)

This invention relates to a fishing line which can be inflated to lift fish to the surface of the water.

In many types of fishing, such as deep sea fishing, the work of maneuvering a fishing line at great depths, particularly when a heavy load of fish is on the line, is often so great as to discourage or prevent many people from deep sea fishing.

This invention provides a fishing line with an inflatable member attached to it and arranged so the member can be inflated while submerged in water to give the member sufficient buoyancy to lift the line and any fish on it toward the water surface.

Preferably, the device includes means responsive to the water surrounding the inflatable member for causing it to be inflated and thereby automatically lift the fishing line toward the surface without requiring any operation from the fisherman.

In one form, a water-sensitive gas-release agent is disposed in or connected to the inflatable member so that as the member and fishing line sink in the water, water enters the member and contacts the gas-release agent, thereby forming gas which inflates the member and lifts the line to the surface. An orifice can be used to control the rate of water flowing in so that the line sinks to the required depth before the member is inflated. Alternatively, the agent has a water-soluble coating to provide the required time delay. In another form, a pressure-responsive valve is used so that water is not admitted into the member until fishing depth is reached.

In yet another embodiment, a container of gas under pressure, say, a conventional $CO_2$ cartridge, is mounted in the member and is mechanically punctured by external water pressure as the member sinks in the water to release gas and inflate the member to lift the fishing line. Preferably, a pressure relief valve is provided to permit gas to escape from the inflatable member as it approaches the water surface and thereby prevent it from bursting.

These and other aspects of the invention will be more fully understood from the following detailed description and the accompanying drawings, in which:

FIG. 1 is a fragmentary schematic sectional elevation of one embodiment of the invention; and FIG. 2 is a fragmentary schematic sectional elevation of another embodiment of the invention.

Referring to FIG. 1, a container 10 has a screwed-on cap 12 with a neck 14 which makes a tight fit inside an elastic balloon 16. A clamp 17 holds the balloon on the neck. A first bushing 18 with an orifice 19 opening through it is screwed into an opening 20 in one side of the container. A spring 21 and ball 22 form an inlet check valve against the inner end of the orifice 19. The inlet check valve prevents entry of fluid into the container until sufficient external pressure is reached to overcome the action of the spring 21. The valve will not permit fluid to flow out of the container.

A pressure relief check valve 24 includes a bushing 26 screwed into an opening 27 in the side of the container and a ball 28 and compression spring 30 urging the ball against the outer end of an orifice 32 through the container wall. The compression spring 30 prevents the escape of any fluid from the container's interior until the interior pressure exceeds the exterior pressure by an amount which overcomes the force of spring 30.

A capsule 34 of a chemical gas-release agent which releases the gas on contact with water is disposed in the bottom of the container. The gas-release agent may be any conventional material, such as sodium or calcium carbide. The capsule may be of any suitable material which is soluble in water. Gelatin is a convenient material to use, and its thickness and solubility can control the length of time required for the gas-release agent to become activated after water has entered the container.

A fishing line 36 is secured at its upper end to a swivel 38 on the bottom of the container. A plurality of fishing hooks 40 are secured by leaders 41 to the fishing line. A weight at the lower end of the fishing line keeps it relatively taut as the device moves through the water.

The device shown in FIG. 1 is used by baiting the hooks and casting the device into the water with the balloon not inflated, or at least having inadequate buoyancy to prevent the device from sinking. As the weight approaches the bottom of the water, or a depth at which fish are expected to be found, water forces its way into the inlet valve and dissolves the capsule which contains the gas-release agent. Gas is formed by reaction of water with the agent so that the balloon is inflated and caused to expand to provide sufficient buoyancy to lift the fishing device and any fish on the hooks toward the surface of the water. In fishing for deep cod, it may be necessary for the device to be set to sink to a depth of 300 to 600 feet. When the device is in a school of cod fish, the fish usually bite within a matter of a few minutes, so it is not necessary for the device to remain at its lowest level for any length of time much greater than that.

As the device approaches the water surface, the water pressure decreases and eventually the pressure release valve is forced open to permit some gas to be expelled from the balloon and prevent its bursting. After the device reaches the surface, the fish are removed from the hooks, and the device is reused. If the fish are cod, as they approach the surface, the air within their lungs also expands and causes the fish to become buoyant so that they aid the device in floating to the surface.

From the foregoing description, it will be apparent that the device avoids the use of a long fishing line, and requires virtually no effort on the part of the fisherman. It is a particular advantage of the device that it is not necessary for the fisherman to reel in a heavy load of fish from a great depth of water.

The embodiment shown in FIG. 2 is similar to that shown in FIG. 1, except that the inlet valve is omitted and the capsule of chemical gas-release agent is replaced by a cartridge 42 of gas under pressure. The cartridge can contain conventional $CO_2$ and can be opened by puncturing with a pin 44. The sharp end of the pin is directed against the conventional diaphragm (not shown) sealed across the mouth of the cartridge. The other end of the pin is connected to a bellows 46 sealed across an opening 48 in the container 10. As the fishing device of FIG. 2 drops through the water, the external pressure builds up to displace the bellows inwardly with sufficient force to pierce the seal on the gas cartridge. When the seal is pierced, the pressure in the cartridge is sufficient to drive the gas out into the chamber and inflate the balloon. The pressure-release valve 24 prevents the balloon or bellows from being ruptured as the device is lifted through the water.

I claim:
1. A fishing device comprising a hollow body having an opening; an inflatable member secured around and in communication with the opening; a fishing line secured to the body; a fish hook secured to the line; gas inflation means disposed within the body and constructed and arranged for increasing the gas pressure within the body when the body sinks in water to a depth below about 300 feet, whereby the member is inflated to give the device and any fish on the hook sufficient buoyancy to rise toward the water surface.

2. A fishing device comprising a hollow body having an opening; an inflatable member secured around and in communication with the opening; a fishing line secured to the body; a fish hook secured to the line; gas inflation means disposed within the body and constructed and arranged for increasing the gas pressure within the body when the body sinks in water to a depth below about 300 feet, whereby the member is inflated to give the device and any fish on the hook sufficient buoyancy to rise toward the water surface; and pressure-relief means secured to the body for preventing rupture of the inflatable member as the device rises in the water.

3. A fishing device comprising a hollow body having an opening; an inflatable member secured around and in communication with the opening; a fishing line secured to the body; a fish hook secured to the line; gas inflation means disposed within the body for increasing the gas pressure within the body whereby the member is inflated to give the device and any fish on the hook sufficient buoyancy to rise toward the water surface; actuation means secured to the body for operating the gas inflation means, the actuation means being pre-set to operate when the body sinks in water to a depth of at least 300 feet; and pressure-relief means secured to the body for preventing rupture of the inflatable member as the device rises in the water.

4. A fishing device comprising a hollow body having an opening; an inflatable member secured around and in communication with the opening; a fishing line secured to the body; a fish hook secured to the line; water-actuated gas inflation means disposed within the body for increasing the gas pressure within the body whereby the member is inflated to give the device and any fish on the hook sufficient buoyancy to rise toward the water surface; a water-admitting valve secured to the body for admitting water to the body interior to actuate the gas inflation means, the valve being pre-set to open when the body sinks in water to a depth of at least 300 feet; and pressure-relief means secured to the body for preventing rupture of the inflatable member as the device rises in the water.

References Cited by the Examiner
UNITED STATES PATENTS

| | | | |
|---|---|---|---|
| 2,320,145 | 5/1943 | La Due. | |
| 2,642,693 | 6/1953 | Broady | 43—23 |
| 2,687,541 | 8/1954 | Bannister | 43—25 X |
| 2,892,198 | 6/1959 | Gruenberg | 43—25 X |
| 2,957,641 | 10/1960 | Humphrey | 242—84.1 |
| 2,994,892 | 8/1961 | Paradis. | |

FOREIGN PATENTS 446,334   6/1927   Germany.

SAMUEL KOREN, *Primary Examiner.*

ABRAHAM G. STONE, *Examiner.*